UNITED STATES PATENT OFFICE.

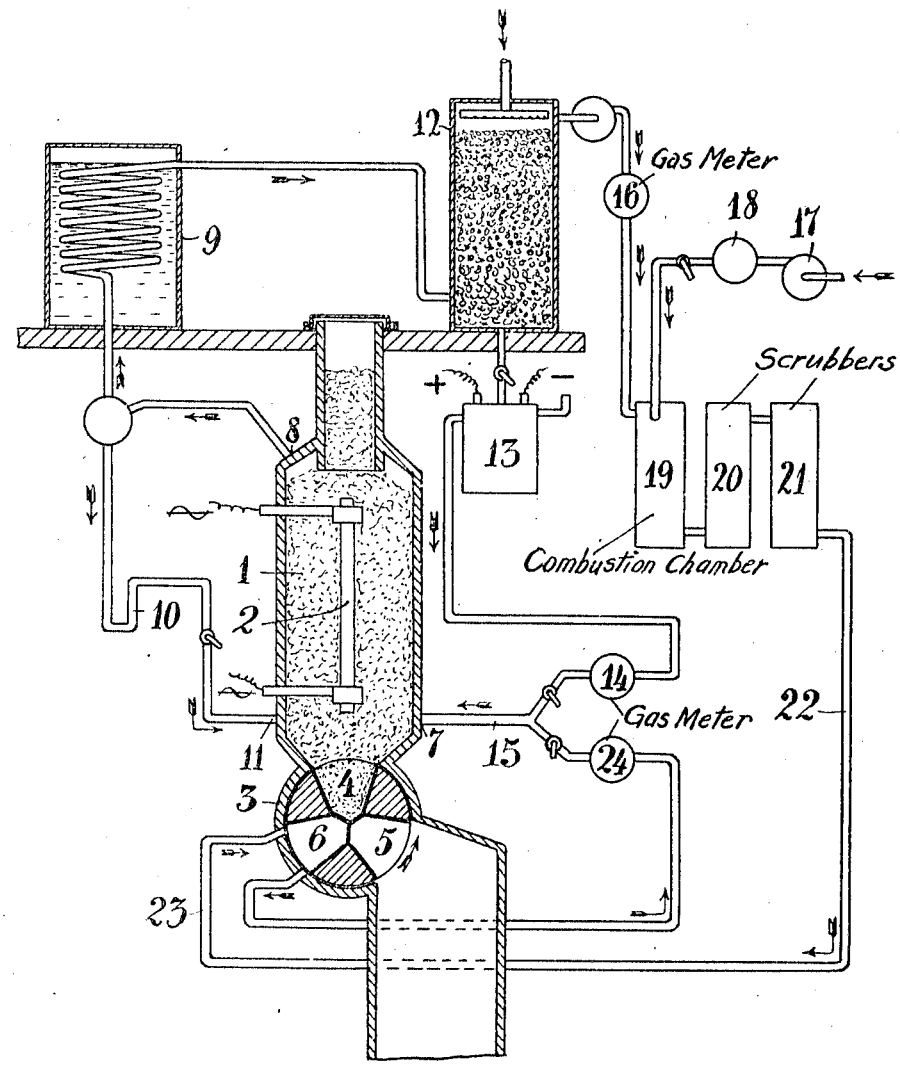

ALF SINDING-LARSEN, OF CHRISTIANIA, NORWAY, ASSIGNOR TO MESSRS. STORM BULL & CO., OF CHRISTIANIA, NORWAY.

PROCESS OF BINDING AND UTILIZING AIR-NITROGEN.

1,031,477.  Specification of Letters Patent.  Patented July 2, 1912.

Application filed May 15, 1911. Serial No. 627,107.

*To all whom it may concern:*

Be it known that I, ALF SINDING-LARSEN, a subject of the King of Norway, residing at Christiania, Norway, have invented certain new and useful Improvements in Processes of Binding and Utilizing Air-Nitrogen; and I do hereby declare the following to be a full, clear, and exact description of the invention, such as will enable others skilled in the art to which it appertains to make and use the same.

My invention has for its object to provide a process for binding and utilizing the nitrogen of the air, and it consists in heating, in a suitable furnace, oxid materials which preferably consist principally of silica or titanic acid, said materials being of natural or technical origin, and with said materials is heated an adequate amount of a reducing agent in the presence of halogen or sulfur, or of compounds that readily give off halogen or sulfur (for instance $SiCl_4, CS_2$, etc.) The oxid materials may also be heated with a mixture or a compound of a halogen and sulfur (for instance $S_2Cl_2$) so that volatile or sublimating compounds of silicon or titanium and halogen or sulfur are formed. These compounds are treated with nitrogen at a suitably high temperature either immediately, or after having been completely or partly freed from the by-products (for instance CO) and from the residual raw material. The nitrogen will then replace the halogen or sulfur, which will, in a free state or in combination with other reagents present (CO, S, etc.) enter into the first part of the process.

As an example of how the process may be carried out I will describe how silicon-nitrogen compounds of various nitrogen content may be produced by the use of quartz, sand, coke or charcoal and nitrogen, as raw materials, and chlorin as the necessary halogen. As above stated the process may be carried out as a direct or an indirect process. In the first case, a mixture of coke and quartz or sand is heated to about white heat in a blast furnace, which permits the introduction of raw material at the top and the taking out of the product from the bottom, but being otherwise closed tight. Somewhat above the bottom of this furnace a mixture of nitrogen and chlorin is first introduced. Tetrachlorid of silicon is formed which then reacts with the excess of quartz and coke to form silicon trichlorid. At the high temperature present this trichlorid will be acted upon by the nitrogen, so that silicon nitrogen compounds are formed, then silicon tetrachlorid is again formed, and so on. A part of the volatile silicon chlorin compounds is liable to escape, together with the carbon monoxid which is formed, and which has to be removed. In order to keep these back, the current of carbon monoxid is conducted through a suitable cooler, where said volatile compounds will be condensed and thereupon led back to the furnace. This process is illustrated in the accompanying drawing in vertical section, in which—

1 designates an electrical resistance furnace of the shaft type, 2 the resistance placed in the central part of the furnace, 3 a revoluble drum arranged at the bottom of the furnace and provided with chambers 4, 5 and 6, any one of which may be so placed as to communicate with the interior of the furnace.

7 designates an inlet for nitrogen and chlorin, and 8 the outlet for the volatile reaction products.

9 designates a cooler, and 12 a reaction chamber supplied with water.

13 designates an electrolytic cell for the production of the chlorin necessary for the process.

19 designates a combustion chamber in which carbon monoxid is burned and 20, 21 are scrubbers in which the combustion gases from the chamber 19 are treated with lime to absorb the carbon dioxid of said gases. A mixture of quartz and carbon is introduced into the shaft furnace 1 from above, and on reaching the central part of the furnace is heated by means of the resistance 2. The chlorin introduced at the inlet 7 reacts with the mixture of silica and carbon forming silicon chlorid, which again reacts with the nitrogen introduced together with the chlorin, and forms silicon nitrid and chlorin.

The reactions may be illustrated by the following equations:

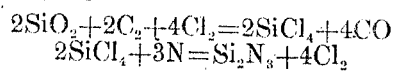

The carbon monoxid combines with some of the chlorin, forming carbonyl chlorid, which together with the excess of carbon monoxid leaves the furnace at the outlet 8 and is conducted into the cooler 9 where part of the carbonyl chlorid is condensed and flows through the pipe 10 back into the furnace at 11. The silicon nitrid formed is discharged by turning the drum 3 one-third revolution to the left, so that the empty chamber 5 is brought directly below the discharge opening of the furnace. The chamber 4, which contains the silicon nitrid, is thereby brought into the position of the chamber 6, and a current of nitrogen from a conduit 23 blown through the same so as to remove the gaseous substances contained in the discharged product and to cool this latter before the chamber is emptied on the next one-third revolution of the drum 3.

The mixture of carbonyl chlorid and carbon monoxid is passed from the cooler 9 into the chamber 12, where the carbonyl chlorid is decomposed by water according to the following equation:

$$COCl_2 + H_2O = CO_2 + 2HCl.$$

The hydrochloric acid formed flows into the electrolytic cell 13, where it is decomposed, and the chlorin formed passes through the gas meter 14 into the furnace at 7. The carbon monoxid from the chamber 12 is blown through a gas meter 16 into the combustion chamber 19, which is supplied with air by a fan 17 through a gas meter 18. The combustion products are treated with lime in the scrubbers 20 and 21 to absorb carbon dioxid, so that the gas leaving the scrubber 21 mainly consists of nitrogen, which is led into the shaft furnace at 6 through the pipes 22, 23, drum 3, gas meter 24 and pipe 15.

It may be of advantage to maintain two different temperature zones in the furnace, one at a red heat and one at a white heat. The chlorin is in this case brought into the furnace at the red-hot zone and the nitrogen at the white-hot zone. The other, or indirect method of carrying out my invention consists in leading only chlorin (optionally carbonyl chlorid or silicon tetrachlorid) into said furnace, which has otherwise the same charge as above-mentioned. The silicon chlorin compounds escaping with the carbon monoxid will become liquefied and then are led into a separate furnace where they are treated with nitrogen at a high temperature, and it may be in the presence of a suitable amount of reagents (such as CO, S, etc.) which are able to take up the chlorin liberated and to readily give it off again. The chlorin or the easily decomposable compounds formed therefrom are then again led back into the first furnace, while the silicon-nitrogen compounds formed are kept back in filters or deposition chambers suitable for this purpose. In order to effect the addition of hydrogen to the silicon-nitrogen compounds, said halogen or sulfur compounds may be mixed with halogen-hydrogen compounds or sulfuretted hydrogen. The silicon-nitrogen compounds or titanium-nitrogen compounds and the like may be directly employed as fertilizers, or they may be transformed into other nitrogen compounds according to known methods.

Claims:

1. The process of binding and utilizing atmospheric nitrogen, which consists in treating oxid materials, together with a reducing agent at a raised temperature with substances consisting of or containing elements capable of forming volatile compounds with the base of said oxid material and treating the obtained volatile compounds with nitrogen at a raised temperature.

2. The process of binding and utilizing atmospheric nitrogen which consists in treating materials containing silica together with a reducing agent at a raised temperature with a substance consisting of or containing elements capable of forming volatile compounds with silicon and treating the obtained volatile compounds with nitrogen at a raised temperature.

3. The process of binding and utilizing atmospheric nitrogen, which consists in treating oxid materials together with a reducing agent at a raised temperature with substances consisting of or containing elements capable of forming volatile compounds with the base of said oxid material, treating the obtained volatile compound with nitrogen at a raised temperature producing hereby nitrogen compounds and a product consisting of or containing the above named elements and using said product again in the first part of the process.

4. The process of binding and utilizing atmospheric nitrogen which consists in treating oxid materials together with a reducing agent at a raised temperature with substances containing or consisting of elements capable of forming volatile compounds with the base of said oxid material and treating the obtained volatile compounds with nitrogen in the presence of carbon monoxid or other substances capable of taking up the above named elements.

In testimony that I claim the foregoing as my invention, I have signed my name in presence of two subscribing witnesses.

ALF SINDING-LARSEN.

Witnesses:
 MARTIN GUTTORMSEN.
 NANA PEDERSON.